(12) United States Patent
Huang et al.

(10) Patent No.: US 12,407,383 B2
(45) Date of Patent: Sep. 2, 2025

(54) ANTENNA SWITCHING METHOD AND APPARATUS

(71) Applicant: VIVO MOBILE COMMUNICATION CO., LTD., Dongguan (CN)

(72) Inventors: Jinning Huang, Dongguan (CN); Yanliang Sun, Dongguan (CN); Ningning Xie, Dongguan (CN); Yi He, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 167 days.

(21) Appl. No.: 18/210,062

(22) Filed: Jun. 14, 2023

(65) Prior Publication Data
US 2023/0327721 A1    Oct. 12, 2023

Related U.S. Application Data

(63) Continuation of application No. PCT/CN2021/136730, filed on Dec. 9, 2021.

(30) Foreign Application Priority Data

Dec. 16, 2020 (CN) .......................... 202011485235.6

(51) Int. Cl.
*H04B 7/06* (2006.01)
*H04B 7/0404* (2017.01)

(52) U.S. Cl.
CPC ......... *H04B 7/0608* (2013.01); *H04B 7/0404* (2013.01)

(58) Field of Classification Search
CPC .. H04B 7/0608; H04B 7/0404; H04B 17/309; H04B 17/382; Y02D 30/70
(Continued)

(56) References Cited

U.S. PATENT DOCUMENTS 9,369,996 B2 *  6/2016  Higuchi ................ H04B 7/061
9,496,937 B1 * 11/2016  Wang .................. H04B 7/0608
(Continued)

FOREIGN PATENT DOCUMENTS

CN    107734586 A    2/2018
CN    109905142 A    6/2019
(Continued)

OTHER PUBLICATIONS

International Search Report issued in corresponding International Application No. PCT/CN2021/136730, mailed Mar. 1, 2022, 7 pages.
(Continued)

*Primary Examiner* — Emmanuel Bayard
(74) *Attorney, Agent, or Firm* — IPX PLLC

(57) ABSTRACT

An antenna switching method and apparatus are provided. The antenna switching method is performed by a terminal and includes: when a network environment of the terminal or a state of the terminal satisfies a first condition, performing an antenna switching state dominated by an uplink, performing uplink transmission sequentially on at least two antennas in the antenna switching state dominated by the uplink, obtaining an uplink transmission parameter of each of the antennas within a first preset time length, and determining a to-be-used uplink antenna according to the uplink transmission parameter. The uplink transmission parameter includes: at least one of a network resource allocation amount, a network speed, a packet data convergence protocol (PDCP) layer rate, a radio link control (RLC) layer rate, a physical layer rate, a closed-loop power control variation of physical uplink shared channel, or a closed-loop power control variation of physical uplink control channel.

18 Claims, 3 Drawing Sheets

In a case that a network environment of the terminal and/or a state of the terminal satisfies a first condition, perform an antenna switching state dominated by the uplink, perform uplink transmission sequentially on at least two antennas in the antenna switching state dominated by the uplink, obtain an uplink transmission parameter of each of the antennas within a first preset time length, and determine a to-be-used uplink antenna according to the uplink transmission parameter; where the uplink transmission parameter includes: at least one of a network resource allocation amount, a network speed, a PDCP layer rate, an RLC layer rate, a physical layer rate, a closed-loop power control variation of uplink shared physical channel, and a closed-loop power control variation of uplink control physical channel

(58) Field of Classification Search
USPC .................. 375/260, 267, 295, 299, 347
See application file for complete search history.

(56) References Cited

U.S. PATENT DOCUMENTS

| | | | | |
|---|---|---|---|---|
| 11,323,161 | B2* | 5/2022 | Liu | H04B 7/0404 |
| 2011/0143807 | A1* | 6/2011 | Aue | H04B 7/0671 |
| | | | | 370/280 |
| 2013/0225223 | A1* | 8/2013 | Nukala | H04W 52/265 |
| | | | | 455/522 |
| 2015/0094003 | A1 | 4/2015 | Ramkumar et al. | |
| 2015/0305035 | A1* | 10/2015 | Hu | H04B 1/0458 |
| | | | | 370/329 |
| 2017/0142688 | A1* | 5/2017 | Ioffe | H04B 7/0486 |
| 2020/0228187 | A1* | 7/2020 | Shi | H04B 1/713 |
| 2020/0322015 | A1 | 10/2020 | Kim et al. | |
| 2021/0083749 | A1* | 3/2021 | Shi | H04B 1/713 |
| 2021/0159956 | A1* | 5/2021 | Weissman | H04B 7/0604 |

FOREIGN PATENT DOCUMENTS

| | | |
|---|---|---|
| CN | 110098857 A | 8/2019 |
| CN | 110290277 A | 9/2019 |
| CN | 110299936 A | 10/2019 |
| CN | 110311716 A | 10/2019 |
| CN | 112583504 A | 3/2021 |
| EP | 2924887 A1 | 9/2015 |
| IN | 107508627 A | 12/2017 |
| JP | 10163938 A | 6/1998 |

OTHER PUBLICATIONS

First Office Action issued in corresponding CN Patent Application No. 202011485235.6, dated Mar. 14, 2022, 6 pages.

* cited by examiner

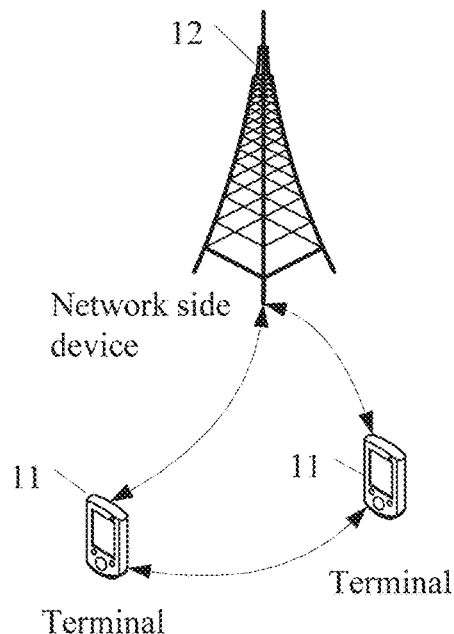

FIG. 1

In a case that a network environment of the terminal and/or a state of the terminal satisfies a first condition, perform an antenna switching state dominated by the uplink, perform uplink transmission sequentially on at least two antennas in the antenna switching state dominated by the uplink, obtain an uplink transmission parameter of each of the antennas within a first preset time length, and determine a to-be-used uplink antenna according to the uplink transmission parameter; where the uplink transmission parameter includes: at least one of a network resource allocation amount, a network speed, a PDCP layer rate, an RLC layer rate, a physical layer rate, a closed-loop power control variation of uplink shared physical channel, and a closed-loop power control variation of uplink control physical channel ⟶ 21

FIG. 2

ANTENNA SWITCHING METHOD AND APPARATUS

CROSS-REFERENCE TO RELATED APPLICATIONS

This application is a continuation of International Application No. PCT/CN2021/136730, filed Dec. 9, 2021, which claims priority to Chinese Patent Application No. 202011485235.6, filed Dec. 16, 2020. The entire contents of each of the above-referenced applications are expressly incorporated herein by reference.

TECHNICAL FIELD

The present application relates to the communication technology field, and specifically relates to an antenna switching method and apparatus.

BACKGROUND

In the process of implementing this application, the inventors found at least the following problems in the prior art: for the uplink, currently both a 4G terminal and a 5G NSA (Non-Standalone) terminal only select one antenna from all activated antennas for transmission. Besides, in most of the current antenna switching algorithms, the channel quality of different antennas is determined based on the signal strength difference received by the downlink antennas, to perform uplink antenna switching, which is called antenna switching dominated by the downlink. However, when the channel quality of the terminal downlink channel is not exactly the same as that of the uplink channel, the terminal may switch to an antenna with poor uplink channel quality.

SUMMARY

The purpose of the embodiments of the present application is to provide an antenna switching method and apparatus.

According to a first aspect, an antenna switching method is provided, and the method includes:
in a case that a network environment of the terminal and/or a state of the terminal satisfies a first condition, performing an antenna switching state dominated by the uplink, performing uplink transmission sequentially on at least two antennas in the antenna switching state dominated by the uplink, obtaining an uplink transmission parameter of each of the antennas within a first preset time length, and determining a to-be-used uplink antenna according to the uplink transmission parameter;
where the uplink transmission parameter includes: at least one of a network resource allocation amount, a network speed, a PDCP layer rate, an RLC layer rate, a physical layer rate, a closed-loop power control variation of physical uplink shared channel, or a closed-loop power control variation of physical uplink control channel.

According to a second aspect, an antenna switching apparatus is provided, and the antenna switching apparatus includes:
an uplink switching module, configured to: in a case that a network environment of the terminal and/or a state of the terminal satisfies a first condition, perform an antenna switching state dominated by the uplink, perform uplink transmission sequentially on at least two antennas in the antenna switching state dominated by the uplink, obtain an uplink transmission parameter of each of the antennas within a first preset time length, and determine a to-be-used uplink antenna according to the uplink transmission parameter;
where the uplink transmission parameter includes: at least one of a network resource allocation amount, a network speed, a packet data convergence protocol (PDCP) layer rate, a radio link control (RLC) layer rate, a physical layer rate, a closed-loop power control variation of physical uplink shared channel, or a closed-loop power control variation of physical uplink control channel.

According to a third aspect, a terminal is provided, where the terminal includes a processor, a memory, and a program or an instruction stored in the memory and executable on the processor, and when the program or the instruction is executed by the processor, steps of the method according to the first aspect are implemented.

According to a fourth aspect, a readable storage medium is provided. The readable storage medium stores a program or an instruction, and the program or the instruction is executed by a processor to implement the steps of the method in the first aspect.

According to a fifth aspect, a chip is provided. The chip includes a processor and a communication interface, the communication interface is coupled to the processor, and the processor is configured to run a program or an instruction of a network side device to implement the method according to the first aspect.

According to a sixth aspect, a computer program product is provided, stored in a nonvolatile storage medium, and the computer program product is executed by at least one processor to implement the method according to the first aspect.

In the embodiments of the present application, in the case that the network environment and/or the state of the terminal satisfies the first condition, the antenna switching state dominated by the uplink is performed, to avoid that whether the antenna of the terminal is switched depends mainly on the judgment of a downlink situation. Therefore, this avoids that when the downlink channel quality of the terminal is inconsistent with that of the uplink channel, the terminal switches to an antenna with poor uplink channel quality.

BRIEF DESCRIPTION OF DRAWINGS

FIG. 1 is a block diagram of a wireless communication system to which embodiments of this application can be applied;

FIG. 2 is a schematic flowchart of an antenna switching method provided in an embodiment of the present application;

DETAILED DESCRIPTION

Figure 3:
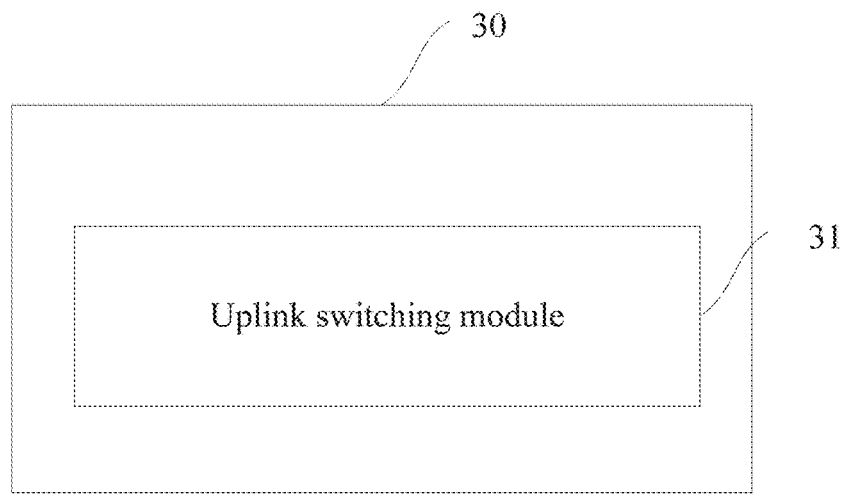
FIG. 3 is a schematic structural diagram of an antenna switching apparatus provided in an embodiment of the present application.

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

Terms "first" and "second" in the specification and claims of this application are used to distinguish between similar objects, and do not need to be used to describe a specific order or sequence. It should be understood that, data termed in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of this application are not limited to a Long-Term Evolution (LTE)/LTE-Advanced (LTE-A) system, and can also be used in other wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, a New Radio (NR) system is described in the following description for illustrative purposes, and the NR terminology is used in most of the following description, although these technologies can also be applied to applications other than the NR system application, such as the $6^{th}$ Generation (6G) communication system.

FIG. 1 is a block diagram of a wireless communication system to which an embodiment of this application is applicable. The wireless communication system includes a terminal 11 and a network side device 12. The terminal 11 may also be referred to as a terminal device or User Equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes a bracelet, a headset, glasses, and the like. It should be noted that a specific type of the terminal 11 is not limited in the embodiments of this application. The network side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

The antenna switching method, the antenna switching apparatus, and the terminal provided in the embodiments of the present application will be described in detail below through specific embodiments and application scenarios with reference to the accompanying drawings.

Refer to FIG. 2. The embodiments of the present application provide an antenna switching method, which is executed by a terminal. The antenna switching method includes:

Step 21: In a case that a network environment of the terminal and/or a state of the terminal satisfies a first condition, perform an antenna switching state dominated by the uplink, perform uplink transmission sequentially on at least two antennas in the antenna switching state dominated by the uplink, obtain an uplink transmission parameter of each of the antennas within a first preset time length, and determine a to-be-used uplink antenna according to the uplink transmission parameter.

The uplink transmission parameter includes: at least one of a network resource allocation amount, a network speed, a PDCP layer rate, an RLC layer rate, a physical layer rate, a closed-loop power control variation of physical uplink shared channel, or a closed-loop power control variation of physical uplink control channel.

In the embodiments of the present application, the terminal uses its network environment and/or the state of the terminal as the basis for judging whether it is an antenna switching state dominated by the uplink or a downlink dominant antenna switching state. When the network environment and/or the state of the terminal satisfies the first condition, the antenna switching state dominated by the uplink is performed, so that in the antenna switching state dominated by the uplink, the uplink to-be-used antenna can be determined according to the uplink transmission parameter. This avoids that when the terminal performs antenna switching mainly by relying on the quality of the downlink channel, the terminal may switch to an antenna with poor uplink channel quality.

That is, the performing an antenna switching state dominated by the uplink includes:
performing uplink transmission sequentially on at least two antennas, and obtaining an uplink transmission parameter of each of the antennas within a first preset time length; and
determining a to-be-used uplink antenna according to the uplink transmission parameter.

In some embodiments, when the antenna switching state dominated by the uplink is performed, the uplink transmission is sequentially performed on each antenna (the total number of antennas should be at least two), and the uplink transmission parameter of each antenna within the first preset time length is obtained. Then, according to the uplink transmission parameter of each antenna, an antenna with the best uplink transmission condition is selected as the uplink antenna from all antennas, thereby improving the uplink communication quality and uplink communication rate of the terminal.

In some implementation manners of the present application, a start time corresponding to sequentially performing uplink transmission on at least two antennas may be a time when the terminal just enters the antenna switching state dominated by the uplink, or the corresponding start time may be a time when a timer expires, where the start time of the timer is the time when the terminal just enters the antenna switching state dominated by the uplink, or the start time of the timer is a time when the previous uplink transmission of N antennas ends.

In some embodiments of the present application, the uplink transmission parameter may include: at least one of a network resource allocation amount, a network speed, a PDCP layer rate, an RLC layer rate, a physical layer rate, a closed-loop power control variation of physical uplink shared channel, or a closed-loop power control variation of physical uplink control channel.

Exemplarily, in a case that the uplink transmission parameter includes a network resource allocation amount, the determining the to-be-used uplink antenna according to the uplink transmission parameter includes: calculating an average value of the network resource allocation amounts in an uplink scheduling grant (UL grant) of each antenna within the first preset time length, that is, a size of an uplink transmission block scheduled by the network within a certain period of time; and if the average value of the network resource allocation amounts corresponding to an antenna is greater than a certain preset threshold, determining the antenna as the to-be-used uplink antenna. The terminal can switch the uplink antenna to this antenna.

As another example, in a case that the uplink transmission parameter includes the closed-loop power control variation of the physical uplink shared channel, the determining the to-be-used uplink antenna according to the uplink transmission parameter is: calculating a value of a closed-loop power control variation of the physical uplink shared channel (PUSCH) of each antenna within the first preset time length, and if the closed-loop power control variation of the physical uplink shared channel corresponding to an antenna is greater than a preset threshold, determining the antenna as the to-be-used uplink antenna. The terminal can switch the uplink antenna to this antenna.

For another example, in a case that the uplink transmission parameter includes a closed-loop power control variation of the physical uplink control channel, the determining the to-be-used uplink antenna according to the uplink transmission parameter is: calculating a value of the closed-loop power control variation of the physical uplink control channel (PUCCH) of each antenna within the first preset time length, and if the closed-loop power control variation of the physical uplink control channel corresponding to an antenna is greater than a preset threshold, determining the antenna as the to-be-used uplink antenna. The terminal can switch the uplink antenna to this antenna.

In some implementation manners, when the uplink transmission parameter includes at least two items, the determining may be made according to a weighted calculation result of the at least two items. For example, when the uplink transmission parameter includes Packet Data Convergence Protocol (PDCP) layer rate, radio link control (RLC) layer rate, and physical layer rate, each item can be assigned a corresponding weight, for example, the weight distribution ratio is: 0.3, 0.3, and 0.4. Then, a weighted sum of the PDCP layer rate, RLC layer rate, and physical layer rate is calculated according to the assigned weights. If the weighted sum corresponding to a certain antenna is greater than a certain preset threshold, the antenna is determined as the to-be-used uplink antenna. The terminal can switch the uplink antenna to this antenna. It can be known that, in general, when the uplink transmission parameter includes more items, the evaluation and determining of the uplink communication quality of each antenna is more accurate, and the uplink communication quality of the uplink antenna finally adopted by the terminal is generally better. In addition, the uplink transmission parameter may also include other uplink communication quality indicators, so that the terminal can adopt the antenna with the best overall uplink transmission condition.

In the embodiments of the present application, after the to-be-used uplink antenna is determined and the terminal switches to the uplink antenna, if the uplink transmission rate does not meet a preset improvement level, the terminal can switch to the original antenna.

In this embodiment of the application, the first condition may include at least one of the following:
  within a second preset time length, determining that there is uplink data to be sent;
  within a third preset time length, determining that the environment is in a quasi-stationary state;
  within a fourth preset time length, determining that the uplink is stuck; or within a fifth preset time length, the terminal stays continuously in a same cell, and/or the terminal determines whether to perform antenna switching by itself.

That is, if the network environment of the terminal and/or the state of the terminal satisfies at least one of the above-mentioned first conditions, the terminal will perform an antenna switching state dominated by the uplink, so as to determine the to-be-used uplink antenna according to the quality of the uplink channel.

Within a second preset time length, the determining that there is uplink data to be sent includes:
  a buffered amount of uplink data of the terminal is greater than a first threshold, in one or more logical channels in a physical layer and/or data link layer, the minimum value or average value of the buffered amount of the uplink data is greater than the first threshold, or the minimum or average value of the buffered amount of the uplink data in the network layer and/or the transport layer is greater than the first threshold, where the buffered amount of the uplink data may be sampled according to each uplink transmission time slot, and the first threshold may be set depending on different cases; and/or
  a target application of the terminal is in an activated state, the terminal has an application whitelist, applications on the application whitelist are all target applications, and that the target application is in an activated state means that the terminal has a demand for uplink data transmission.

Within a third preset time length, the determining that the environment is in a quasi-stationary state includes:
  determining that a variation of reference signal received power of the antenna of the terminal is less than a second threshold, and/or a position of the terminal remains unchanged.

The variation of the reference signal received power of the antenna of the terminal is less than the second threshold. In some embodiments, the variation of the combined reference signal received power (RSRP) of all antennas of the terminal is less than the second threshold, and/or the variation of the reference signal received power on each antenna is less than the second threshold, and/or the maximum or average value of differences between the maximum values and minimum values of the reference signal received power of all antennas at each sampling point is less than the second threshold. The variation can be determined in the following manner: first obtaining the maximum or average value of the reference signal received power within a third preset time length, and the variation is a positive difference between reference signal received power sampled within a certain time interval and the maximum or average value. The variation can also be determined in the following manner: selecting, as a reference value, a measured value of the reference signal received power at a time when the terminal performs the antenna switching state dominated by the uplink, and the variation is an absolute value of reference signal received power sampled at a certain time interval compared to the reference value. In addition, the variation can also be determined in the following manner: after selecting, as a reference value, a measured value of the reference signal received power at a time when the terminal performs the antenna switching state dominated by the uplink, updating the reference value at certain intervals (such as a third preset time length)(that is, selecting a measured value of the reference signal received power at the time at intervals of the third preset time length as a new reference value), then, an absolute value of the difference between the reference signal received power sampled at a certain time interval and each reference value is obtained, and that the maximum absolute value or the minimum absolute value is less than the second threshold is used as a judgment basis. That the maximum or average value of the differences between the maximum and minimum values of the reference signal reception power of all antennas at each sampling point is less than the second threshold means: first obtaining the maximum and minimum value of the reference signal reception power of each antenna at each sampling point, and then calculating the difference between the maximum and minimum values of the reference signal reception power of each antenna, then that the maximum or average value of the differences of all antennas is less than the second threshold is used as the judgment basis.

That the position of the terminal remains unchanged may be: based on the motion sensor data of the terminal, it is determined that the terminal is in a static state, that is, the terminal does not move.

Within a fourth preset time length, the determining that the uplink is stuck includes:
  determining that a network speed of the terminal is less than a third threshold, and/or an uplink data transmission grant value of the MAC layer of the terminal is less than a fourth threshold, and/or a block error rate of the terminal is greater than a fifth threshold, and/or transmit power of the physical uplink shared channel and/or the physical uplink control channel of the terminal is continuously maintained at the maximum value. That the network speed of the terminal is less than the third threshold may be: within the fourth preset time length, the maximum value or average value of the network speed of the terminal is less than the third threshold. That the uplink data transmission grant value of the MAC layer of the terminal is less than the fourth threshold may be: within the fourth preset time length, the maximum or average value of the uplink data transmission grant value of the Media Access Control (MAC) layer of the terminal is less than the fourth threshold. That the block error rate of the terminal is greater than the fifth threshold may be: within the fourth preset time length, the maximum or average value of the block error rate (BLER) of the terminal is greater than the fifth threshold. That the transmission power of the physical uplink shared channel and/or the physical uplink control channel of the terminal is continuously maintained at the maximum value may be: within the fourth preset time length, the transmission power of the physical uplink shared channel and/or the physical uplink control channel of the terminal is continuously maintained at the maximum value.

Within the fifth preset time length, that the terminal continuously resides in a same cell may be: the terminal continuously resides in a certain frequency division duplex (FDD) cell.

Within the fifth preset time length, that the terminal determines whether to perform antenna switching by itself includes:
  on an LTE network, the terminal does not support antenna selection, and/or on an LTE network, the terminal supports antenna selection but the network does not configure antenna selection, and/or in a 5G NR scenario, the terminal supports antenna selection.

That is, on the 4G LTE network, the terminal does not support the protocol-defined antenna selection, and/or on the 4G LTE network, the terminal supports antenna selection and reports capability support, but the network does not configure corresponding antenna selection. Supporting the protocol-defined antenna selection means that the terminal can report support for antenna selection, and the terminal reports an uplink sounding reference signal (SRS) to the network, and the network determines, according to the SRS reported by the terminal, which antenna is the antenna with the best uplink transmission, and then instructs the terminal whether to switch. If the terminal does not support protocol-defined antenna selection, it indicates that the terminal can determine whether to switch by itself, that is, when the terminal can determine whether to switch by itself, the antenna switching state dominated by the uplink is performed. In the 5G NR scenario, the terminal supports antenna selection, which is equivalent to that the terminal reports that the maximum number of SRS resources is 2.

In the embodiment of the present application, the antenna switching method further includes:
  in a case that the network environment of the terminal and/or the state of the terminal satisfies a second condition, switching from the antenna switching state dominated by the uplink to an antenna switching state dominated by the downlink, and in the antenna switching state dominated by the downlink, determining the to-be-used uplink antenna according to quality and/or strength of a signal received by the downlink antenna.

That is, if the terminal satisfies the second condition at any time, the terminal will exit the antenna switching state dominated by the uplink and return to the antenna switching state dominated by the downlink.

In some embodiments of the present application, the second condition includes: within a sixth preset time length, determining that there is no uplink data to be sent;
  within a seventh preset time length, determining that the environment is not in a quasi-stationary state;
  within an eighth preset time length, determining that the uplink is not in a stuck state; and
  within a ninth preset time length, the terminal does not continuously stay in a same cell and the terminal cannot determine whether to perform antenna switching by itself.

The judgment basis of the second condition is opposite to that of the first condition. Exemplarily, in the first condition, the basis for determining that there is uplink data to be sent is: the buffered amount of the uplink data of the terminal is greater than the first threshold, and/or the target application of the terminal is in an activated state. However, in the second condition, it is determined that there is no uplink data to be sent, that is, the buffered amount of the uplink data of the terminal is not greater than the first threshold, and the target application of the terminal is not in an activated state. As another example, in the first condition, the basis for determining that the environment is in a quasi-stationary state is: a variation of the reference signal received power of the antenna of the terminal is less than a second threshold, and/or the position of the terminal remains unchanged. However, in the second condition, it is determined that the environment is not in a quasi-stationary state, that is, the variation of the reference signal received power of the antenna of the terminal is not less than the second threshold, and the position of the terminal changes. The other items of the second condition can be deduced by analogy, and will not be repeated here to avoid repetition.

In this embodiment of the present application, the second preset time length may be equal to the sixth preset time length, the third preset duration may be equal to the seventh preset time length, the fourth preset time length may be equal to the eighth preset time length, and the fifth preset time length may be equal to the ninth preset time length.

In the embodiments of the present application, in the case that the network environment and/or the state of the terminal satisfies the first condition, the antenna switching state dominated by the uplink is performed, and in the case that the second condition is satisfied, the antenna switching state dominated by the downlink is performed, to avoid that whether the antenna of the terminal is switched depends mainly on the judgment of a downlink situation. Therefore, this avoids that when the downlink channel quality of the terminal is inconsistent with that of the uplink channel, the terminal switches to an antenna with poor uplink channel quality.

It should be noted that, the antenna switching method provided in the embodiment of the present application may be executed by an antenna switching apparatus, or a control module in the antenna switching apparatus for executing the antenna switching method. In the embodiment of the present application, the antenna switching being performed by the antenna switching apparatus is taken as an example to describe the antenna switching apparatus provided in the embodiment of the present application.

Refer to FIG. 3. FIG. 3 is a schematic structural diagram of an antenna switching apparatus provided in an embodiment of the present application. As shown in FIG. 3, another embodiment of the present application also provides an antenna switching apparatus, and the antenna switching apparatus 30 includes:

an uplink switching module 31, configured to: in a case that a network environment of the terminal and/or a state of the terminal satisfies a first condition, perform an antenna switching state dominated by the uplink, perform uplink transmission sequentially on at least two antennas in the antenna switching state dominated by the uplink, obtain an uplink transmission parameter of each of the antennas within a first preset time length, and determine a to-be-used uplink antenna according to the uplink transmission parameter.

The uplink transmission parameter includes: at least one of a network resource allocation amount, a network speed, a PDCP layer rate, an RLC layer rate, a physical layer rate, a closed-loop power control variation of physical uplink shared channel, or a closed-loop power control variation of physical uplink control channel.

In some embodiments, the first condition includes at least one of the following:
within a second preset time length, determining that there is uplink data to be sent;
within a third preset time length, determining that the environment is in a quasi-stationary state;
within a fourth preset time length, determining that the uplink is stuck; or
within a fifth preset time length, the terminal stays continuously in a same cell, and/or the terminal determines whether to perform antenna switching by itself.

In some embodiments, the determining that there is uplink data to be sent includes:
determining that a buffered amount of uplink data of the terminal is greater than a first threshold, and/or a target application of the terminal is in an activated state.

In some embodiments, the determining that the environment is in a quasi-stationary state includes:
determining that a variation of reference signal received power of the antenna of the terminal is less than a second threshold, and/or a position of the terminal remains unchanged.

In some embodiments, the determining that the uplink is stuck includes:
determining that a network speed of the terminal is less than a third threshold, and/or an uplink data transmission grant value of the MAC layer of the terminal is less than a fourth threshold, and/or a block error rate of the terminal is greater than a fifth threshold, and/or transmit power of the physical uplink shared channel and/or the physical uplink control channel of the terminal is continuously maintained at the maximum value.

In some embodiments, that the terminal determines whether to perform antenna switching by itself includes:
on an LTE network, the terminal does not support antenna selection, and/or on an LTE network, the terminal supports antenna selection but the network does not configure antenna selection, and/or in a 5G NR scenario, the terminal supports antenna selection.

In some embodiments, the apparatus further includes:
a downlink switching module, configured to: in a case that the network environment of the terminal and/or the state of the terminal satisfies a second condition, switch from the antenna switching state dominated by the uplink to an antenna switching state dominated by the downlink, and in the antenna switching state dominated by the downlink, determine the to-be-used uplink antenna according to quality and/or strength of a signal received by the downlink antenna.

In some embodiments, the second condition includes:
within a sixth preset time length, determining that there is no uplink data to be sent;
within a seventh preset time length, determining that the environment is not in a quasi-stationary state;
within an eighth preset time length, determining that the uplink is not in a stuck state; and
within a ninth preset time length, the terminal does not continuously stay in a same cell and the terminal cannot determine whether to perform antenna switching by itself.

In the embodiments of the present application, in the case that the network environment and/or the state of the terminal satisfies the first condition, the antenna switching state dominated by the uplink is performed, to avoid that whether the antenna of the terminal is switched depends mainly on the judgment of a downlink situation. Therefore, this avoids that when the downlink channel quality of the terminal is inconsistent with that of the uplink channel, the terminal switches to an antenna with poor uplink channel quality.

The antenna switching apparatus in the embodiment of the present application may be an apparatus, or may be a component, an integrated circuit, or a chip in a terminal. The apparatus may be a mobile terminal, or a non-mobile terminal. For example, the mobile terminal may include but is not limited to the types of the terminal enumerated above; and the non-mobile terminal may be a server, a network attached storage (NAS), a personal computer (PC), a television (TV), an automated teller machine, or a self-service machine. This is not specifically limited in this embodiment of this application.

The antenna switching apparatus in the embodiment of the present application may be an apparatus with an operating system. The operating system may be an Android operating system, an iOS operating system, or another possible operating system. This is not specifically limited in the embodiments of this application.

The antenna switching device provided in the embodiment of the present application can implement various processes implemented in the method embodiment in FIG. 2 and achieve the same technical effect. To avoid repetition, details are not described here.

Figure 4:
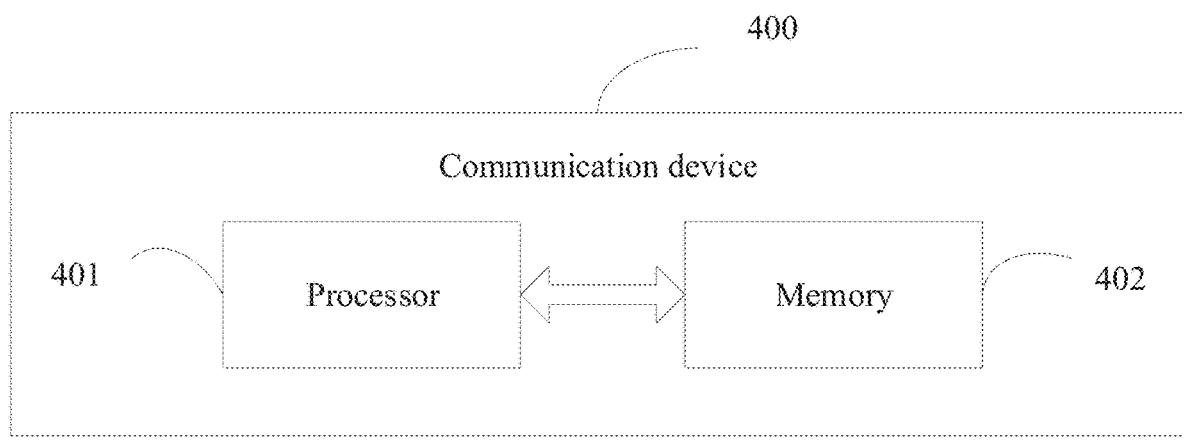
FIG. 4 is a schematic structural diagram of a communication device provided in an embodiment of the present application.

In some embodiments, as shown in FIG. 4, an embodiment of the present application further provides a communication device 400, including a processor 401, a memory 402, and a program or an instruction stored in the memory 402 and executable on the processor 401. For example, when the communication device 400 is a terminal, when the program or instruction is executed by the processor 401, each process of the embodiment of the foregoing antenna switching method is performed, and the same technical effect can be achieved. To avoid repetition, details are not repeated herein. When the communication device 400 is a network side device, when the programs or instructions are executed by the processor 401, each process of the above embodiment of the switching method is performed, and the same technical effect can be achieved. To avoid repetition, details are not repeated herein.

Figure 5:
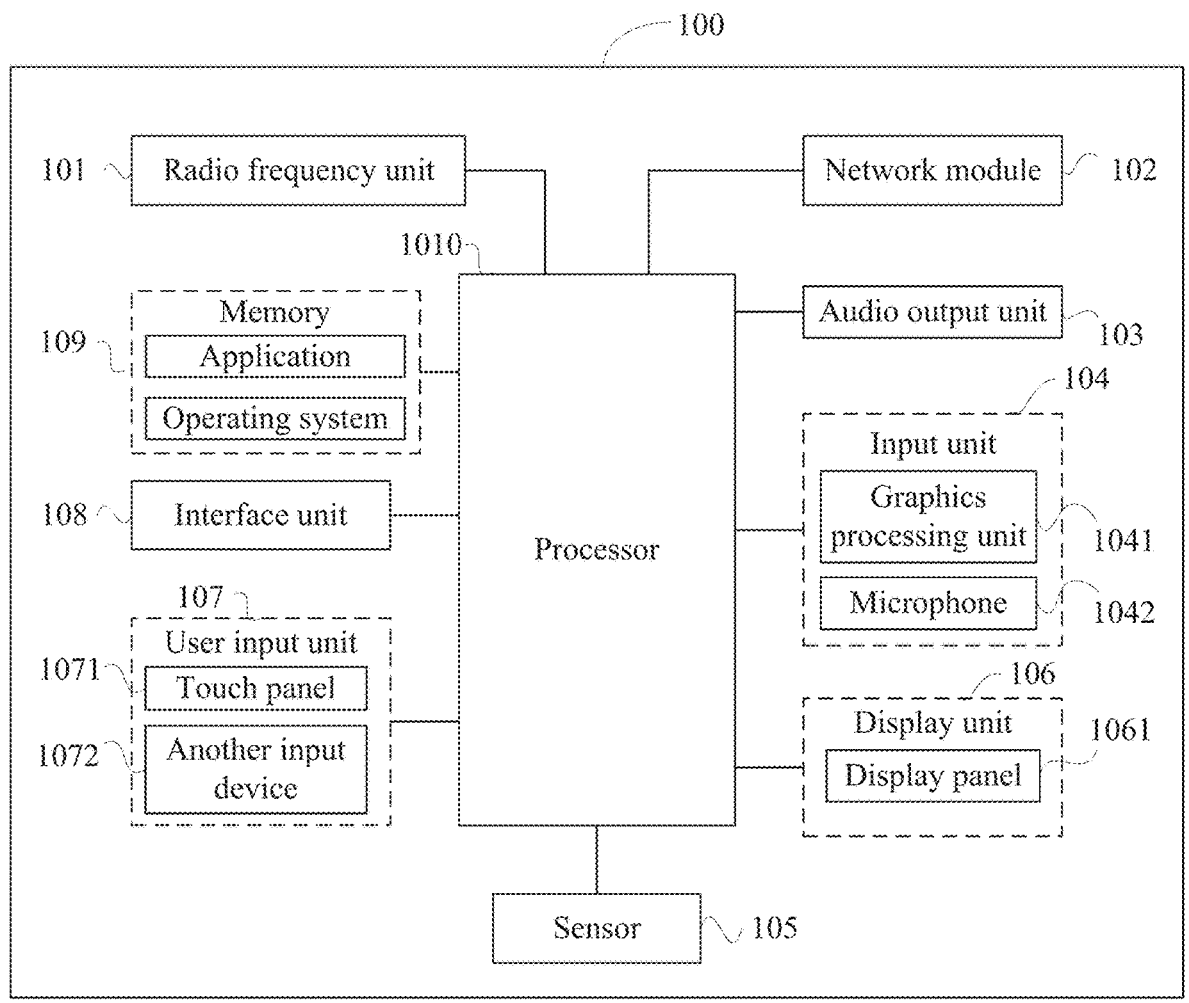
FIG. 5 is a schematic structural diagram of hardware of a terminal provided in an embodiment of this application.

FIG. 5 is a schematic structural diagram of hardware of a terminal according to an embodiment of this application.

The terminal 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

It may be understood by a person skilled in the art that the terminal 100 may further include a power supply (such as a battery) that supplies power to each component. The power supply may be logically connected to the processor 110 by using a power management system, to implement functions such as charging, discharging, and power consumption management by using the power management system. The terminal structure shown in FIG. 5 constitutes no limitation on the terminal, and the terminal may include more or fewer components than those shown in the figure, or combine some components, or have different component arrangements. Details are not described herein.

It should be understood that, in this embodiment of this application, the input unit 104 may include a graphics processing unit (GPU) 1041 and a microphone 1042, and the graphics processing unit 1041 processes image data of a still picture or a video obtained by an image capture apparatus (for example, a camera) in a video capture mode or an image capture mode. The display unit 106 may include a display panel 1061. In some embodiments, the display panel 1061 may be configured in a form such as a liquid crystal display or an organic light-emitting diode. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein.

In this embodiment of this application, the radio frequency unit 101 receives downlink data from a network side device and then sends the downlink data to the processor 110 for processing; and sends uplink data to the network side device. Usually, the radio frequency unit 101 includes but is not limited to an antenna, at least one amplifier, a transceiver, a coupler, a low noise amplifier, a duplexer, and the like.

The memory 109 may be configured to store a software program or an instruction and various data. The memory 109 may mainly include a program or instruction storage area and a data storage area. The program or instruction storage area may store an operating system, and an application or an instruction required by at least one function (for example, a sound playing function or an image playing function). In addition, the memory 109 may include a high-speed random-access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage component, a flash memory component, or another non-volatile solid-state storage component.

The processor 110 may include one or more processing units. In some embodiments, an application processor and a modem processor may be integrated into the processor 110. The application processor mainly processes an operating system, a user interface, an application, an instruction, or the like. The modem processor mainly processes wireless communication, for example, a baseband processor. It can be understood that, the modem processor may not be integrated into the processor 110.

The processor 110 is configured to: in a case that a network environment of the terminal and/or a state of the terminal satisfies a first condition, perform an antenna switching state dominated by the uplink, and in the antenna switching state dominated by the uplink, determine a to-be-used uplink antenna according to the uplink transmission parameter.

In the embodiments of the present application, in the case that the network environment and/or the state of the terminal satisfies the first condition, the antenna switching state dominated by the uplink is performed, to avoid that whether the antenna of the terminal is switched depends mainly on the judgment of a downlink situation. Therefore, this avoids that when the downlink channel quality of the terminal is inconsistent with that of the uplink channel, the terminal switches to an antenna with poor uplink channel quality.

In some embodiments, the radio frequency unit 101 is configured to perform uplink transmission sequentially on at least two antennas, and obtain an uplink transmission parameter of each of the antennas within a first preset time length; and the processor 110 is further configured to determine the to-be-used uplink antenna according to the uplink transmission parameter.

In some embodiments, the uplink transmission parameter includes: at least one of a network resource allocation amount, a network speed, a PDCP layer rate, an RLC layer rate, a physical layer rate, a closed-loop power control variation of physical uplink shared channel, or a closed-loop power control variation of physical uplink control channel.

In some embodiments, the first condition includes at least one of the following:
within a second preset time length, determining that there is uplink data to be sent;
within a third preset time length, determining that the environment is in a quasi-stationary state;
within a fourth preset time length, determining that the uplink is stuck; or
within a fifth preset time length, the terminal stays continuously in a same cell, and/or the terminal determines whether to perform antenna switching by itself.

In some embodiments, the determining that there is uplink data to be sent includes:
determining that a buffered amount of uplink data of the terminal is greater than a first threshold, and/or a target application of the terminal is in an activated state.

In some embodiments, the determining that the environment is in a quasi-stationary state includes:
determining that a variation of reference signal received power of the antenna of the terminal is less than a second threshold, and/or a position of the terminal remains unchanged.

In some embodiments, the determining that the uplink is stuck includes:
determining that a network speed of the terminal is less than a third threshold, and/or an uplink data transmission grant value of the MAC layer of the terminal is less than a fourth threshold, and/or a block error rate of the terminal is greater than a fifth threshold, and/or transmit power of the physical uplink shared channel and/or the physical uplink control channel of the terminal is continuously maintained at the maximum value.

In some embodiments, that the terminal determines whether to perform antenna switching by itself includes:
on an LTE network, the terminal does not support antenna selection, and/or on an LTE network, the terminal supports antenna selection but the network does not configure antenna selection, and/or in a 5G NR scenario, the terminal supports antenna selection.

In some embodiments, the processor 110 is further configured to: in a case that the network environment of the terminal and/or the state of the terminal satisfies a second condition, switch from the antenna switching state dominated by the uplink to an antenna switching state dominated by the downlink, and in the antenna switching state dominated by the downlink, determine the to-be-used uplink antenna according to quality and/or strength of a signal received by the downlink antenna.

In some embodiments, the second condition includes:
within a sixth preset time length, determining that there is no uplink data to be sent;
within a seventh preset time length, determining that the environment is not in a quasi-stationary state;
within an eighth preset time length, determining that the uplink is not in a stuck state; and
within a ninth preset time length, the terminal does not continuously stay in a same cell and the terminal cannot determine whether to perform antenna switching by itself.

An embodiment of the present application further provides a readable storage medium. The readable storage medium stores a program or an instruction, and when the program or the instruction is executed by a processor, the various processes of the foregoing antenna switching method embodiment is performed and the same technical effects can be achieved. To avoid repetition, details are not described herein again.

The processor is a processor in the terminal in the foregoing embodiment. The readable storage medium includes a computer-readable storage medium, such as a computer read-only memory (ROM), a random access memory (RAM), a magnetic disk, or an optical disc.

An embodiment of the present application further provides a chip, the chip includes a processor and a communication interface, the communication interface is coupled to the processor, and the processor is configured to run the program or instruction of the network side device to realize each process of the embodiment of the antenna switching method, and can achieve the same technical effect. To avoid repetition, details are not repeated herein.

It should be understood that the chip mentioned in this embodiment of this application may also be referred to as a system-level chip, a system chip, a chip system, or an on-chip system chip.

The embodiment of the present application further provides a computer program product, the computer program product is stored in a non-volatile storage medium, and the computer program product is executed by at least one processor to implement the various processes in the above antenna switching method embodiment, and can achieve the same technical effect. To avoid repetition, it will not be repeated herein.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

A person of ordinary skill in the art may be aware that, in combination with the examples described in the embodiments disclosed in this specification, units and algorithm steps may be implemented by using electronic hardware or a combination of computer software and electronic hardware. Whether these functions are implemented by using hardware or software depends on the specific application and design constraints of the technical solution. A person skilled in the art may use different methods to implement the described functions for each particular application, but it should not be considered that the implementation goes beyond the scope of the present disclosure.

It may be clearly understood by a person skilled in the art that, for convenience and brevity of description, for a specific working process of the above described system, apparatus, and unit, reference may be made to a corresponding process in the above method embodiments. Details are not described herein again.

In the embodiments provided in this application, it should be understood that the disclosed apparatus and method may be implemented in another manner. For example, the apparatus embodiments described above are only an example. For example, the division of the units is only logical function division. There may be other division manners in actual implementation, for example, multiple units or components may be combined or integrated into another system, or some features may be ignored or not implemented. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate; and parts displayed as units may or may not be physical units, may be located in one place, or may be distributed on a plurality of network units. Some or all of the units may be selected based on an actual requirement to implement the objectives of the solutions in the embodiments.

In addition, functional units in the embodiments of the present disclosure may be integrated into one processing unit, or each of the units may exist alone physically, or two or more units are integrated into one unit.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

The invention claimed is:

1. An antenna switching method, performed by a terminal, comprising:
when a network environment of the terminal or a state of the terminal satisfies a first condition, performing an antenna switching state dominated by an uplink, performing uplink transmission sequentially on at least two antennas in the antenna switching state dominated by the uplink, obtaining an uplink transmission parameter of each of the antennas within a first preset time length, and determining a to-be-used uplink antenna according to the uplink transmission parameter,
wherein the uplink transmission parameter comprises: at least one of a network resource allocation amount, a network speed, a packet data convergence protocol (PDCP) layer rate, a radio link control (RLC) layer rate, a physical layer rate, a closed-loop power control variation of physical uplink shared channel, or a closed-loop power control variation of physical uplink control channel; and
when the network environment of the terminal or the state of the terminal satisfies a second condition, switching from the antenna switching state dominated by the uplink to an antenna switching state dominated by a downlink, and in the antenna switching state dominated by the downlink, determining the to-be-used uplink antenna according to quality or strength of a signal received by a downlink antenna.

2. The antenna switching method according to claim 1, wherein the first condition comprises at least one of the following:
within a second preset time length, determining that there is uplink data to be sent;
within a third preset time length, determining that the environment is in a quasi-stationary state;
within a fourth preset time length, determining that the uplink is stuck; or
within a fifth preset time length, the terminal stays continuously in a same cell, or the terminal determines whether to perform antenna switching by itself.

3. The antenna switching method according to claim 2, wherein the determining that there is uplink data to be sent comprises:
determining that a buffered amount of uplink data of the terminal is greater than a first threshold, or a target application of the terminal is in an activated state.

4. The antenna switching method according to claim 2, wherein the determining that the environment is a quasi-stationary state comprises:
determining that a variation of reference signal received power of the antenna of the terminal is less than a second threshold, or a position of the terminal remains unchanged.

5. The antenna switching method according to claim 2, wherein the determining that the uplink is in a stuck state comprises:
determining that a network speed of the terminal is less than a third threshold, or an uplink data transmission grant value of a medium access control (MAC) layer of the terminal is less than a fourth threshold, or a block error rate of the terminal is greater than a fifth threshold, or transmit power of the physical uplink shared channel or the physical uplink control channel of the terminal is continuously maintained at the maximum value.

6. The antenna switching method according to claim 1, wherein the second condition comprises:
within a sixth preset time length, determining that there is no uplink data to be sent;
within a seventh preset time length, determining that the environment is not in a quasi-stationary state;
within an eighth preset time length, determining that the uplink is not in a stuck state; and
within a ninth preset time length, the terminal does not continuously stay in a same cell and the terminal cannot determine whether to perform antenna switching by itself.

7. A terminal, comprising:
a memory storing a computer program; and
a processor coupled to the memory and configured to execute the computer program to perform operations comprising:
when a network environment of the terminal or a state of the terminal satisfies a first condition, performing an antenna switching state dominated by an uplink, performing uplink transmission sequentially on at least two antennas in the antenna switching state dominated by the uplink, obtaining an uplink transmission parameter of each of the antennas within a first preset time length, and determining a to-be-used uplink antenna according to the uplink transmission parameter, wherein the uplink transmission parameter comprises: at least one of a network resource allocation amount, a network speed, a packet data convergence protocol (PDCP) layer rate, a radio link control (RLC) layer rate, a physical layer rate, a closed-loop power control variation of physical uplink shared channel, or a closed-loop power control variation of physical uplink control channel; and when the network environment of the terminal or the state of the terminal satisfies a second condition, switching from the antenna switching state dominated by the uplink to an antenna switching state dominated by a downlink, and in the antenna switching state dominated by the downlink, determining the to-be-used uplink antenna according to quality or strength of a signal received by a downlink antenna.

8. The terminal according to claim 7, wherein the first condition comprises at least one of the following:

within a second preset time length, determining that there is uplink data to be sent;

within a third preset time length, determining that the environment is in a quasi-stationary state;

within a fourth preset time length, determining that the uplink is stuck; or within a fifth preset time length, the terminal stays continuously in a same cell, or the terminal determines whether to perform antenna switching by itself.

9. The terminal according to claim 8, wherein the determining that there is uplink data to be sent comprises:

determining that a buffered amount of uplink data of the terminal is greater than a first threshold, or a target application of the terminal is in an activated state.

10. The terminal according to claim 8, wherein the determining that the environment is a quasi-stationary state comprises:

determining that a variation of reference signal received power of the antenna of the terminal is less than a second threshold, or a position of the terminal remains unchanged.

11. The terminal according to claim 8, wherein the determining that the uplink is in a stuck state comprises:

determining that a network speed of the terminal is less than a third threshold, or an uplink data transmission grant value of a medium access control (MAC) layer of the terminal is less than a fourth threshold, or a block error rate of the terminal is greater than a fifth threshold, or transmit power of the physical uplink shared channel or the physical uplink control channel of the terminal is continuously maintained at the maximum value.

12. The terminal according to claim 7, wherein the second condition comprises:

within a sixth preset time length, determining that there is no uplink data to be sent;

within a seventh preset time length, determining that the environment is not in a quasi-stationary state;

within an eighth preset time length, determining that the uplink is not in a stuck state; and within a ninth preset time length, the terminal does not continuously stay in a same cell and the terminal cannot determine whether to perform antenna switching by itself.

13. A non-transitory computer-readable storage medium, storing a computer program, when the computer program is executed by a processor of a terminal, causes the processor to perform operations comprising:

when a network environment of the terminal or a state of the terminal satisfies a first condition, performing an antenna switching state dominated by an uplink, performing uplink transmission sequentially on at least two antennas in the antenna switching state dominated by the uplink, obtaining an uplink transmission parameter of each of the antennas within a first preset time length, and determining a to-be-used uplink antenna according to the uplink transmission parameter, wherein the uplink transmission parameter comprises: at least one of a network resource allocation amount, a network speed, a packet data convergence protocol (PDCP) layer rate, a radio link control (RLC) layer rate, a physical layer rate, a closed-loop power control variation of physical uplink shared channel, or a closed-loop power control variation of physical uplink control channel; and when the network environment of the terminal or the state of the terminal satisfies a second condition, switching from the antenna switching state dominated by the uplink to an antenna switching state dominated by a downlink, and in the antenna switching state dominated by the downlink, determining the to-be-used uplink antenna according to quality or strength of a signal received by a downlink antenna.

14. The non-transitory computer-readable storage medium according to claim 13, wherein the first condition comprises at least one of the following:

within a second preset time length, determining that there is uplink data to be sent;

within a third preset time length, determining that the environment is in a quasi-stationary state;

within a fourth preset time length, determining that the uplink is stuck; or within a fifth preset time length, the terminal stays continuously in a same cell, or the terminal determines whether to perform antenna switching by itself.

15. The non-transitory computer-readable storage medium according to claim 14, wherein the determining that there is uplink data to be sent comprises:

determining that a buffered amount of uplink data of the terminal is greater than a first threshold, or a target application of the terminal is in an activated state.

16. The non-transitory computer-readable storage medium according to claim 14, wherein the determining that the environment is a quasi-stationary state comprises:

determining that a variation of reference signal received power of the antenna of the terminal is less than a second threshold, or a position of the terminal remains unchanged.

17. The non-transitory computer-readable storage medium according to claim 14, wherein the determining that the uplink is in a stuck state comprises:

determining that a network speed of the terminal is less than a third threshold, or an uplink data transmission grant value of a medium access control (MAC) layer of the terminal is less than a fourth threshold, or a block error rate of the terminal is greater than a fifth threshold, or transmit power of the physical uplink shared channel or the physical uplink control channel of the terminal is continuously maintained at the maximum value.

18. The non-transitory computer-readable storage medium according to claim 13,
   wherein the second condition comprises:
      within a sixth preset time length, determining that there is no uplink data to be sent;
      within a seventh preset time length, determining that the environment is not in a quasi-stationary state;
      within an eighth preset time length, determining that the uplink is not in a stuck state; and
      within a ninth preset time length, the terminal does not continuously stay in a same cell and the terminal cannot determine whether to perform antenna switching by itself.

* * * * *